US006932277B1

(12) United States Patent
Ericksen et al.

(10) Patent No.: US 6,932,277 B1
(45) Date of Patent: Aug. 23, 2005

(54) SPRINKLER VALVE WIRING APPARATUS AND METHOD

(75) Inventors: Kent C. Ericksen, Centerville, UT (US); Michael Ray Erickson, Farmington, UT (US); Chadwick L. Wilson, Woods Cross, UT (US); Christian Michael Olsen, Salt Lake City, UT (US); Edwin McAuley, Quarry Bay (HK)

(73) Assignee: Orbit Irrigation Products, Inc., Bountiful, UT (US)

( * ) Notice: Subject to any disclaimer, the term of this patent is extended or adjusted under 35 U.S.C. 154(b) by 282 days.

(21) Appl. No.: 10/278,218

(22) Filed: Oct. 21, 2002

(51) Int. Cl.$^7$ .......................... B05B 17/00; A01G 27/00

(52) U.S. Cl. .............................. 239/1; 239/67; 239/69; 239/70; 239/201; 239/207; 239/550; 239/562; 137/624.12

(58) Field of Search ........................... 239/67–70, 200, 239/201, 203–207, 550, 562, 565, 569, 728, 239/DIG. 15, 1; 174/50, 58, 59; 137/624.11, 137/624.12, 624.2, 364

(56) References Cited

U.S. PATENT DOCUMENTS

| 3,937,402 | A | * | 2/1976 | Query .......................... 239/70 |
| 4,265,403 | A | * | 5/1981 | Bonetti ......................... 239/70 |
| 4,961,538 | A | * | 10/1990 | Hewitt ........................ 239/728 |
| 5,957,155 | A |  | 9/1999 | Lovejoy |
| 6,286,765 | B1 | * | 9/2001 | Byles .......................... 239/67 |
| 6,460,563 | B2 |  | 10/2002 | Olson et al. |
| 6,622,933 | B1 | * | 9/2003 | Young et al. .................. 239/69 |

* cited by examiner

Primary Examiner—Steven J. Ganey
(74) Attorney, Agent, or Firm—Madson & Metcalf

(57) ABSTRACT

A sprinkler valve wiring apparatus and method are provided. An irrigation system has a plurality of valves designed to be electrically activated by a control unit. Valve wires extend from the valves to a junction unit. Control unit wires extend from the control unit to the junction unit, and are electrically coupled to the valve wires within the junction unit. The control unit wires include a common wire and a plurality of hot wires. Each hot wire is coupled to a corresponding valve, while the common wire is coupled to all of the valves by the junction unit. The junction unit utilizes resilient blocking members with frangible portions that block unused wire receptacles and can be removed to provide watertight access to the remaining wire receptacles. The junction unit is fixed in place via an anchoring mechanism such as a pipe clip or stake.

32 Claims, 5 Drawing Sheets

SPRINKLER VALVE WIRING APPARATUS AND METHOD

BACKGROUND OF THE INVENTION

1. Field of the Invention

The present invention relates to irrigation systems and methods. More specifically, the present invention relates to an apparatus and method for securing and interconnecting wires between a plurality of valves and a control unit such as a timer.

2. Description of Related Art

Irrigation not only permits foodstuffs to be grown, but also enables the cultivation of attractive plant life that otherwise would not have sufficient water to thrive. Many households now utilize sprinkler systems to provide irrigation in a comparatively uniform and trouble-free manner.

Often, a control unit such as a timer is used to regularly initiate operation of the sprinkler system to automatically provide the desired distribution of irrigation water. The timer is electrically connected to a plurality of electrically operated valves, each of which is able to permit water to flow into a corresponding zone of the sprinkler system. The valves must be individually activated so that the entire pressure and flow rate available will be focused on each zone, in turn.

Typically, the timer and valves are sold separately. The valves each have a pair of valve wires, which may come attached to the valves. However, a separate length of control unit wiring must be used to attach the timer to the valves. Unfortunately, the control unit wires typically do not match up, one-to-one, with the valve wires. Rather, the control unit wires typically include a plurality of "hot" wires, each of which is to be attached to one of the valves. Additionally, the control unit wires include a "common" wire, which is to be attached to all of the valves. Thus, a procedure known as "pigtailing" must be used to attach extra lengths of wire to the common wire and to each of the valves. Each wire junction is typically made through the use of a wire nut or a similar device.

This process can be somewhat confusing, especially for a homeowner unfamiliar with electrical wiring or sprinkler control systems. Wire nuts can be unreliable and difficult to install. Furthermore, it is easy to lose track of which hot wire is connected to which valve. Thus, the homeowner may be forced to resort to trial-and-error attachment of the hot wires to the timer until the desired timer connections are coupled to the proper valves.

Furthermore, the wire nut connections will often be stowed within a manifold box, near the valves. If a leak occurs, the manifold box may fill with water. Thus, the wire nuts must often be covered by grease caps designed to keep water from the electrical connections. The grease caps present a further step to be carried out by the homeowner, who may well be unfamiliar with their use.

Hence, it would be an advancement in the art to provide an apparatus and method by which the valve wires and control unit wires may more easily be connected together. Furthermore, it would be an advancement in the art to provide such an apparatus and method, in which the common wire may be connected to all of the valve wires without requiring the use of extra lengths of wire. Yet further, it would be an advancement in the art to provide an apparatus and method by which control unit wires and valve wires may be easily connected together in an watertight fashion.

SUMMARY OF THE INVENTION

The apparatus of the present invention has been developed in response to the present state of the art, and in particular, in response to the problems and needs in the art that have not yet been fully solved by currently available sprinkler valve wiring systems. Thus, it is an overall objective of the present invention to provide a sprinkler valve wiring apparatus and method that remedies the shortcomings of the prior art.

To achieve the foregoing objective, and in accordance with the invention as embodied and broadly described herein in the preferred embodiment, an irrigation system is used to irrigate an area. The irrigation system has a valving system designed to control flows of an irrigation liquid, such as water, to a plurality of water distribution units such as sprinklers. The sprinklers receive water from a plurality of conduits, each of which is in communication with a valve assembly. Each valve assembly has a valve housing and an actuator designed to move an obstruction member within the valve housing to move the valve assembly between an open configuration and a closed configuration.

Each valve assembly also has a pair of wires that conveys a valve activation signal to the actuator to move the valve assembly between the open and closed configurations. The valve assemblies may be connected together to form a manifold coupled to receive water from a main line. The valve wires may all be coupled to a junction unit attached to the manifold or disposed near it. The manifold and junction unit are disposed underground, within a manifold box, and covered by a lid. Control unit wires extend from the junction unit to a control unit, such as a timer.

The junction unit is configured to facilitate proper electrical connection between the valve wires and the control unit wires. The junction unit has a housing in which a plurality of valve wire receptacles and a plurality of control unit wire receptacles are formed. The control unit wire receptacles are generally covered by a blocking member in which a plurality of finger grips are formed. Each finger grip extends outward from the housing and covers one of the control unit wire receptacles. The valve wire receptacles are also generally covered by a blocking member.

Each blocking member is constructed of a resilient material, such as rubber, and has a plurality of integrally formed frangible portions, each of which covers a receptacle. The frangible portions may be individually torn away to permit access to the corresponding receptacle. The frangible portions may simply be left intact for receptacles that are not to be used to maintain watertightness of the junction unit. After a frangible portion is torn away, a circular lip remains to press against the object inserted into the receptacle, thereby providing a generally watertight seal.

Each pair of valve wires has a junction end with a plug designed for easy insertion into the junction unit. Each plug includes a grip and a conductive prong extending from the grip. Each of the valve wire receptacles has a jack designed to receive the corresponding prong. After insertion of a prong into a jack, the corresponding circular lip of the blocking member presses against the grip to keep moisture from entering the jack.

The control unit wires include a common wire and a plurality of hot wires. Each finger grip also has a frangible portion designed to be torn away. When a frangible portion is torn away, a circular lip remains. However, in the case of the blocking member of the control wire receptacles, the circular lips are sized to directly grip the insulative covers of the control unit wires. Each control unit wire has a stripped portion designed to be inserted into the opening left by tearing away the frangible portion of the corresponding finger grip to reach the corresponding control unit wire receptacle. The circular lip then presses against the insulative cover to keep moisture from entering the control unit wire receptacle.

The junction unit has a support board disposed within the housing. The support board is disposed between a valve side support wall of the housing and a control side support wall of the housing. The support walls keep the blocking members in place. Jack modules are attached to the support board. Each jack module provides a jack for a corresponding valve wire receptacle.

Upper and lower contact arms are also attached to the support board to provide each control unit wire receptacle. Each of the contact arms has a transverse extension with a hole. Each finger grip can be squeezed by hand to bend the upper and lower contact arms within the finger grip, thereby bringing the holes of the transverse extensions into alignment with each other. The stripped portion of the control unit wire can then be inserted into the holes, and the finger grip can be released to retain the stripped portion, which is in electrical communication with the upper and lower contact arms.

Each set of contact arms of the hot wire receptacles is electrically coupled to the corresponding jack module. The contact arms of the common wire receptacle are electrically coupled to all of the jack modules. Each jack therefore communicates with the common wire and one of the hot wires to provide a complete circuit capable of operating the corresponding actuator.

According to one example, a stamped set of conductive pathways may be used to electrically couple the jack modules with the contact arms. Such a stamped set of conductive pathways may be attached to the support board. In the alternative, the support board may be a printed circuit board with the electrical pathways printed directly on its surface to provide electrical communication between the jack modules and the contact arms.

The junction unit has a socket designed to retain an anchoring mechanism that keeps the junction unit in place. The socket has a retention ridge designed to permit the user to snap the anchoring mechanism into engagement with the socket. According to one configuration, the anchoring mechanism may be a pipe clip designed to be attached to the manifold. Alternatively, the anchoring mechanism may be a stake designed to be driven into the ground within the manifold box.

The anchoring mechanism has a square platform with channels disposed along the lateral and longitudinal directions so that the anchoring mechanism can be disposed at a variety of orientations with respect to the control unit. Upon insertion of the platform into the socket, the retention ridge of the socket is engaged by one of the channels of the platform to keep the platform in place within the socket.

Through the use of the valve wiring apparatus and method of the invention, valve assemblies may more rapidly and reliably be wired to a control unit. Wiring may be accomplished without cumbersome wire joining operations. Furthermore, wiring may be easily performed in a manner that generally protects the electrical connections from moisture. These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 6, is not intended to limit the scope of the invention, as claimed, but is merely representative of presently preferred embodiments of the invention.

For this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanism. The term "abutting" refers to items that are in direct physical contact with each other, although the items may not be attached together.

Figure 1:
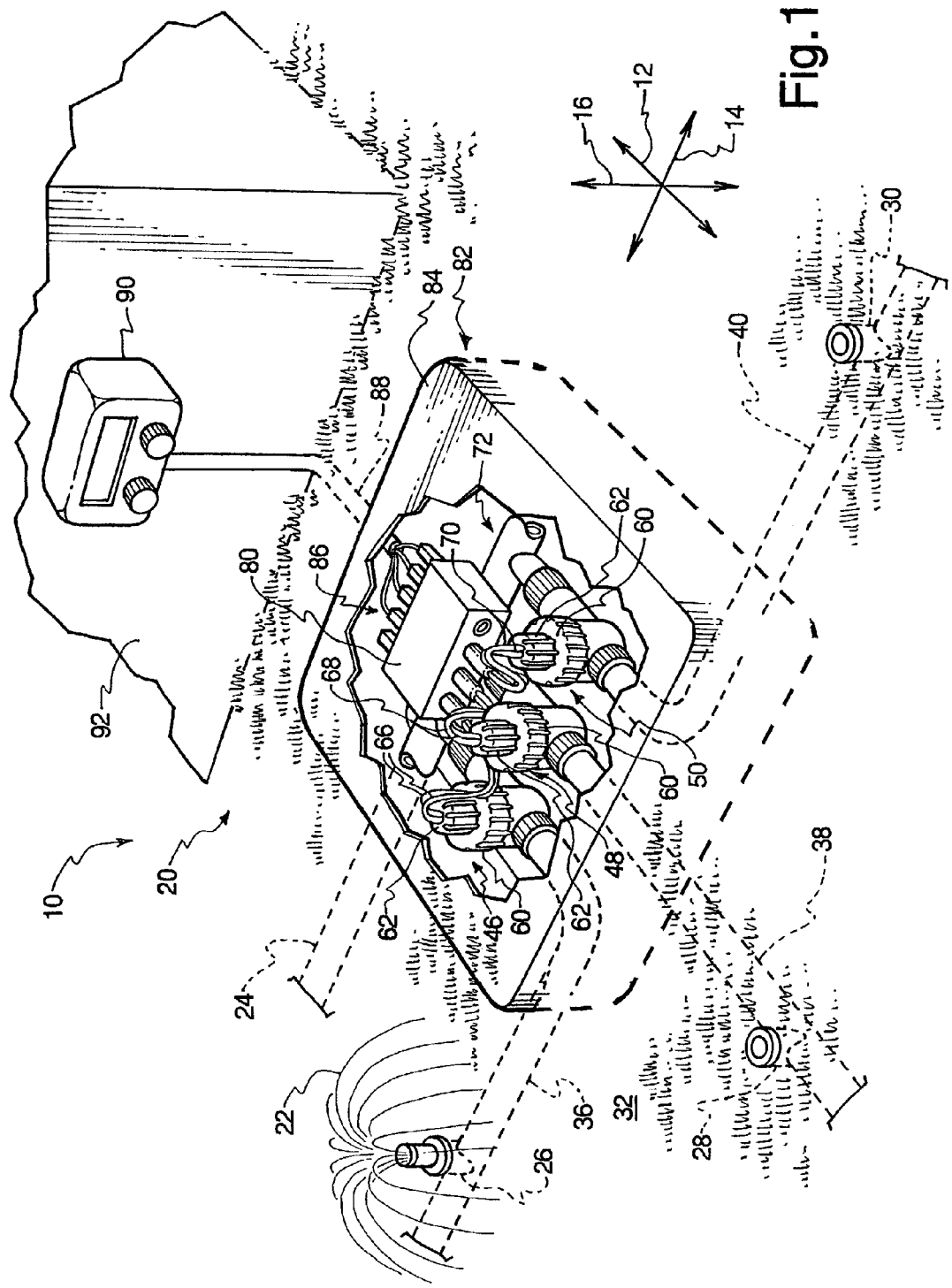
FIG. 1 is a perspective view of a portion of an irrigation system according to one embodiment of the invention, showing the lid of the manifold box partially cut away to reveal the valve assemblies and the junction unit.

Referring to FIG. 1, a perspective view depicts an irrigation system 10 according to one embodiment of the invention. The irrigation system 10 has a longitudinal direction 12, a lateral direction 14, and a transverse direction 16. The irrigation system 10 incorporates a valving system 20, which will be described in greater detail subsequently.

The irrigation system 10 is designed to receive an irrigation liquid, such as water 22, via a main line 24. "Irrigation liquid" refers to any liquid that can be used to promote plant growth. Thus, the irrigation liquid need not be only water as in FIG. 1, but may, for example, include fertilizers, pesticides, or other additives. The water 22 is distributed by a plurality of water distribution units over a patch of land designated for plant growth.

"Water distribution unit" encompasses a variety of devices used to spread water, such as pop-up sprinkler heads, rotary sprinklers, bubblers, drip irrigation systems, and the like. The irrigation system 10 includes water distribution units in the form of a first sprinkler head 26, a second sprinkler head 28, and a third sprinkler head 30. The sprinkler heads 26, 28, 30 are arrayed to irrigate an area 32.

The first, second and third sprinkler heads 26, 28, 30 are supplied with water by first, second and third conduits 36, 38, 40, respectively. Each of the conduits 36, 38, 40 may extend further to supply additional water distribution units (not shown). Water flow to the first, second, and third conduits 36, 38, 40 is controlled by a first valve assembly 46, a second valve assembly 48, and a third valve assembly 50, respectively. The valve assemblies 46, 48, 50 may optionally operate to permit water flow to only one of the conduits 36, 38, 40 at any given time, so that each conduit 36, 38, 40, in turn, receives the full pressure and flow rate of water from the main line 24.

As depicted in FIG. 1, the first valve assembly 46 is in the open configuration to supply water to the first sprinkler head 26 via the first conduit 36. The second and third valve assemblies 48, 50 are in the closed configuration so no significant amount of water flows into the second and third conduits 38, 40, and the second and third sprinkler heads 28, 30 are inactive.

Each of the valve assemblies 46, 48, 50 has a valve housing 60 in fluid communication with the associated conduit 36, 38, or 40. The housing 60 contains an obstruction member (not visible) that is movable within the housing 60 to block or unblock water flow through the valve housing 60. Thus, each valve assembly 46, 48, 50 has a closed configuration, in which water flow is blocked, and an open configuration, in which water flow is comparatively freely permitted.

Each of the valve assemblies 46, 48, 50 also has an actuator 62 attached to the valve housing 60. The actuator 62 actuates the obstruction member to move the valve assembly 46, 48, 50 between the open and closed configurations. The actuator 62 may be an electrically operated device such as a linear or rotary solenoid or an electric motor. The valve assemblies 46, 48, 50 also include first valve wires 66, second valve wires 68, and third valve wires 70, respectively. Each set of valve wires 66, 68, 70 is coupled to the actuator 62 of the corresponding valve assembly 46, 48, 50.

In this application, the term "valve" generally refers to the combination of the valve housing 60, the associated obstruction member, and the actuator 62. The term "valve" is not limited to the embodiment shown, but may include a combination of any actuator with any movable flow path obstruction mechanism. Thus, a valve may be any device that can selectively block and unblock a flow of fluid in response to receipt of an electric signal.

The valve assemblies 46, 48, 50 may be interconnected to form a manifold 72, to which the main line 24 and the conduits 36, 38, 40 are attached. The valve wires 66, 68, 70 are attached to a junction unit 80 disposed near the manifold 72. The manifold 72 and the junction unit 80 are disposed within a manifold box 82, which may be disposed generally underground, as depicted. The manifold box 82 has a lid 84 designed to provide access to the manifold 72 and the junction unit 80 for repairs or maintenance.

A plurality of control unit wires 86 are also connected to the junction unit 80. Except at the ends, the control unit wires 86 are covered by a sheath 88 designed to gather and protect the control wires 86. The control wires 86 extend from the junction unit 80 to a control unit designed to transmit valve activation signals through the control wires 86.

The control unit may take the form of a timer 90, as illustrated in FIG. 1. The timer 90 transmits the valve activation signals via the control unit wires 86 according to a schedule established by a user. The phrase "control unit" is not limited to a timer, but may include any other device that transmits a valve activation signal. Such devices include simple switches, remote receivers, control system processors designed to measure variables and control operation of the irrigation system 10 based on those variables, and the like. The timer 90 may be attached to a wall 92 near the manifold box 82, as shown, or may be disposed at a remote location.

The junction unit 80 operates to facilitate attachment of the valve wires 66, 68, 70 to the control unit wires 86. The junction unit 80 also helps to isolate the conductors of the valve wires 66, 68, 70 and the control unit wires 86 from water, which could potentially short-circuit the connection between the timer 90 and the valve assemblies 46, 48, 50.

In this application, "watertight" refers to a device configured to generally resist water entry. A watertight device need not absolutely reliably keep out water when immersed, but must simply make water entry comparatively unlikely under the conditions that will likely occur within the manifold box 82. The junction unit 80 will be shown and described in greater detail in connection with FIG. 2.

Figure 2:
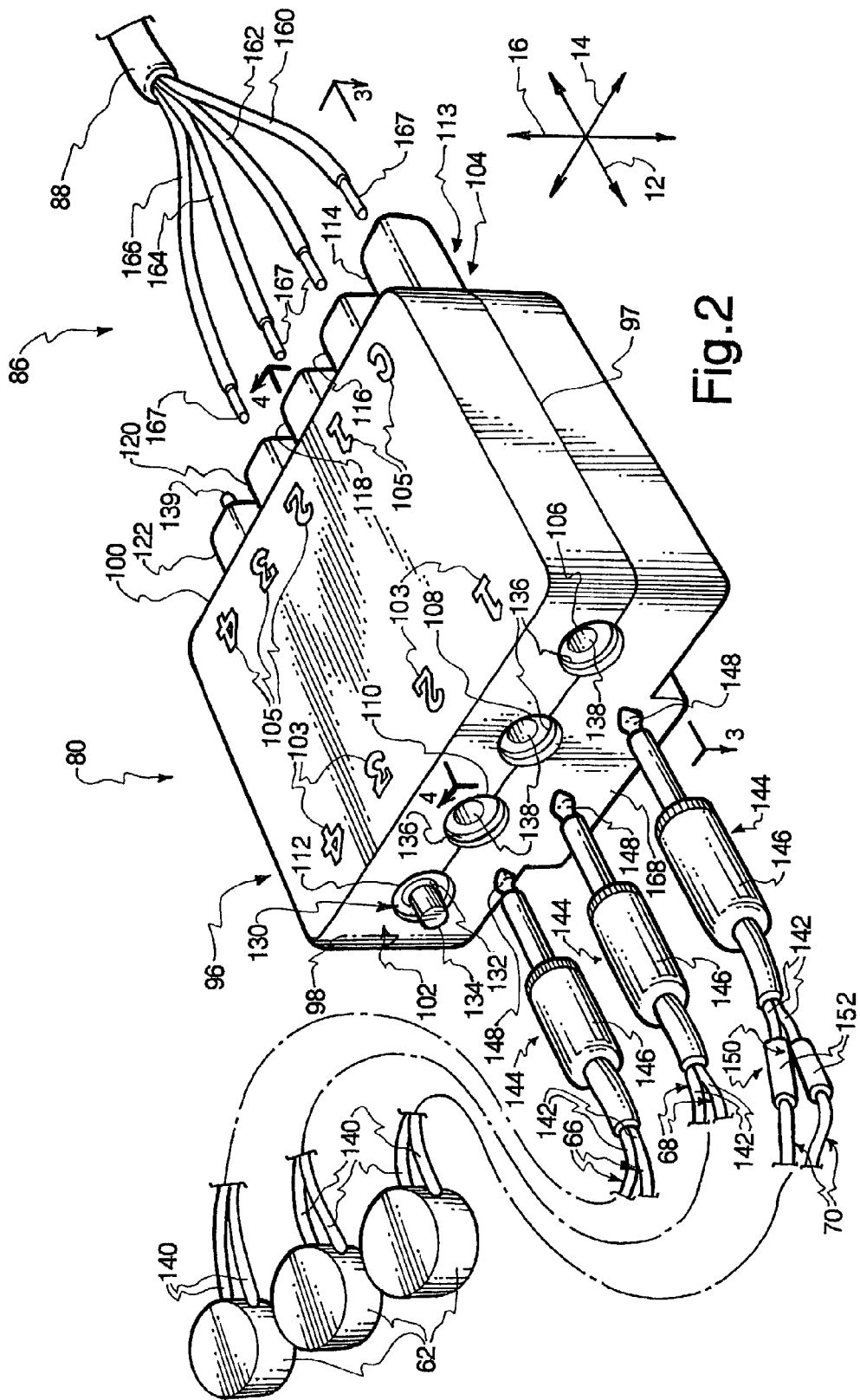
FIG. 2 is an enlarged, perspective view of the junction unit of the irrigation system of FIG. 1.

Referring to FIG. 2, an enlarged, perspective view illustrates the junction unit 80 of FIG. 1 and adjoining structures in greater detail. The junction unit 80 has a housing 96, which may be made from a material such as plastic by a process such as injection molding. The housing 96 may be molded as two portions, which may be attached along an attachment line 97 after insertion of the internal components of the junction unit 80. The two portions of the housing 96 may be glued, sonic welded, radio frequency welded, attached with fasteners and elastomeric seals, or attached together in any other generally watertight fashion.

The housing 96 has a valve side face 98 and an control side face 100, which are parallel and disposed opposite from each other. The faces 98 are named simply for convenience, and are not intended to specify an orientation of the junction unit 80.

A plurality of valve wire receptacles 102 are disposed in the valve side face 98. Indicators 103 on the housing 96 show which of the valve wire receptacles 102 should receive each of the valve wires 66, 68, 70. Similarly, a plurality of control unit receptacles 104 are disposed proximate the control side face 100. Indicators 105 on the housing 96 show which of the control unit wire receptacles 104 should receive each of the control unit wires 86. The valve wire receptacles 102 include a first valve wire receptacle 106, a second valve wire receptacle 108, a third valve wire receptacle 110, and a fourth valve wire receptacle 112.

In this application, the term "receptacle" refers to a cavity designed to receive at least part of some type of projecting feature such as a prong or wire end. The first, second, and third valve wire receptacles 106, 108, 110 correspond to the first, second, and third sets of valve wires 66, 68, 70. The fourth valve wire receptacle 112 is provided for systems that include four valves. Since the irrigation system 10 of FIG. 1 has only three valve assemblies 46, 48, 50 that are to be connected to the junction unit 80, the fourth valve wire receptacle 112 is vacant.

A blocking member 113 is positioned to cover and/or seal the control unit wire receptacles 104. The blocking member 113 is formed of a resilient material such as rubber. Portions of the blocking member 113 extend through openings in the control side face 100 in the form of a common finger grip 114, a first finger grip 116, a second finger grip 118, a third finger grip 120, and a fourth finger grip 122. The configuration and operation of the finger grips 114, 116, 118, 120, and 122 will be shown and described in greater detail subsequently.

Another blocking member 130 is disposed to cover and/or seal the valve wire receptacles 102. As shown, the fourth valve wire receptacle 112 is covered by a frangible portion 132, which may be removed to provide access to the fourth valve wire receptacle 112. In the irrigation system 10 of FIG. 1, the fourth valve wire receptacle 112 is not needed, and may thus remain covered by the frangible portion 132. In this application, the term "frangible portion" refers to a portion of an object that is designed to be mechanically fractured in a predictable manner.

The frangible portion 132 has a protrusion 134 designed to be grasped and pulled by a user to tear out the frangible portion 132. After removal of the frangible portion 132, a circular lip 136 remains, as depicted in the first, second, and third valve wire receptacles 106, 108, 110. The blocking member 130 is comparatively thin in the vicinity of the circular lip 136 so that the circular lip 136 will have the desired shape upon removal of the frangible portion 132. Removal of a frangible portion 132 exposes the underlying jack 138, which is uniquely configured to receive and retain an end of a pair of the valve wires 66, 68, or 70. The fourth finger grip 122 also has a protrusion 139 similar in function to the protrusion 134. The protrusions 134, 139 need not be cylindrical, but may be box-shaped, ridged, or otherwise shaped to permit easy gripping.

Each pair of valve wires 66, 68, 70 has a valve end 140 and a junction end 142. The valve ends 140 may be removably or permanently attached to the actuators 62. Each of the valve wires 66, 68, 70 also has a plug 144 that includes a grip 146 designed to be grasped by hand and a prong 148. The prongs 148 are designed to mate with the jacks 138. The prongs 148 may be standard headphone type prongs, such as 3.5 mm, dual channel prongs. Thus, the jacks 138 may be standard 3.5 mm mini-jacks. The plugs 144 may have a wide variety of alternative configurations.

In this application, the term "wire" is not limited to a conductor, but may include any insulative covers and/or connection members attached to the ends of the conductor. Thus, the plugs 144 are considered to be part of the valve wires 66, 68, 70. A "plug" is a comparatively rigid device configured for easy insertion into a receptacle.

The valve wires 66, 68, 70 may be manufactured with the plugs 144 in place. Alternatively, the plugs 144 may be retrofitted to existing valve wires. Thus a plug 144 may be added to a valve assembly that has only wires extending from the actuator. The third valve wire 70 depicts this configuration. The third valve wire 70 has an intermediate portion in which joints 150 exist where the plug 144 and the junction end 142 were attached to the valve end 140.

The joints 150 may be made watertight or otherwise protected through the use of insulative covers 152. For example, a user may retrofit the plug 144 to the actuator 62 by positioning the conductors of the junction end 142 and the valve end 140 adjacent to each other and applying heat-shrink tubing to provide the insulative covers 152.

The control unit wires 86 include a common wire 160, a first hot wire 162, a second hot wire 164, and a third hot wire 166. The first, second, and third hot wires 162, 164, 166 correspond with the first, second, and third valve assemblies 46, 48, 50, respectively. Hence, the timer 90 may induce current to flow through the circuit formed by the common wire 160 and one of the hot wires 162, 164, 166 to activate the corresponding valve assembly 46, 48, 50. Each of the control unit wires 86 has a stripped portion 167, from which the protective covering has been removed to expose the conductor.

The junction unit 80 also has a socket 168 integrally formed with the housing 96. The socket 168 is designed to retain an anchoring mechanism that can be used to attach the junction unit 80 to the manifold 72 or to the ground. Examples of anchoring mechanisms that may be used will be shown and described subsequently, with reference to FIGS. 5 and 6. First, the internal configuration and operation of the junction unit 80 will be further described with reference to the section views of FIGS. 3 and 4.

Figure 3:
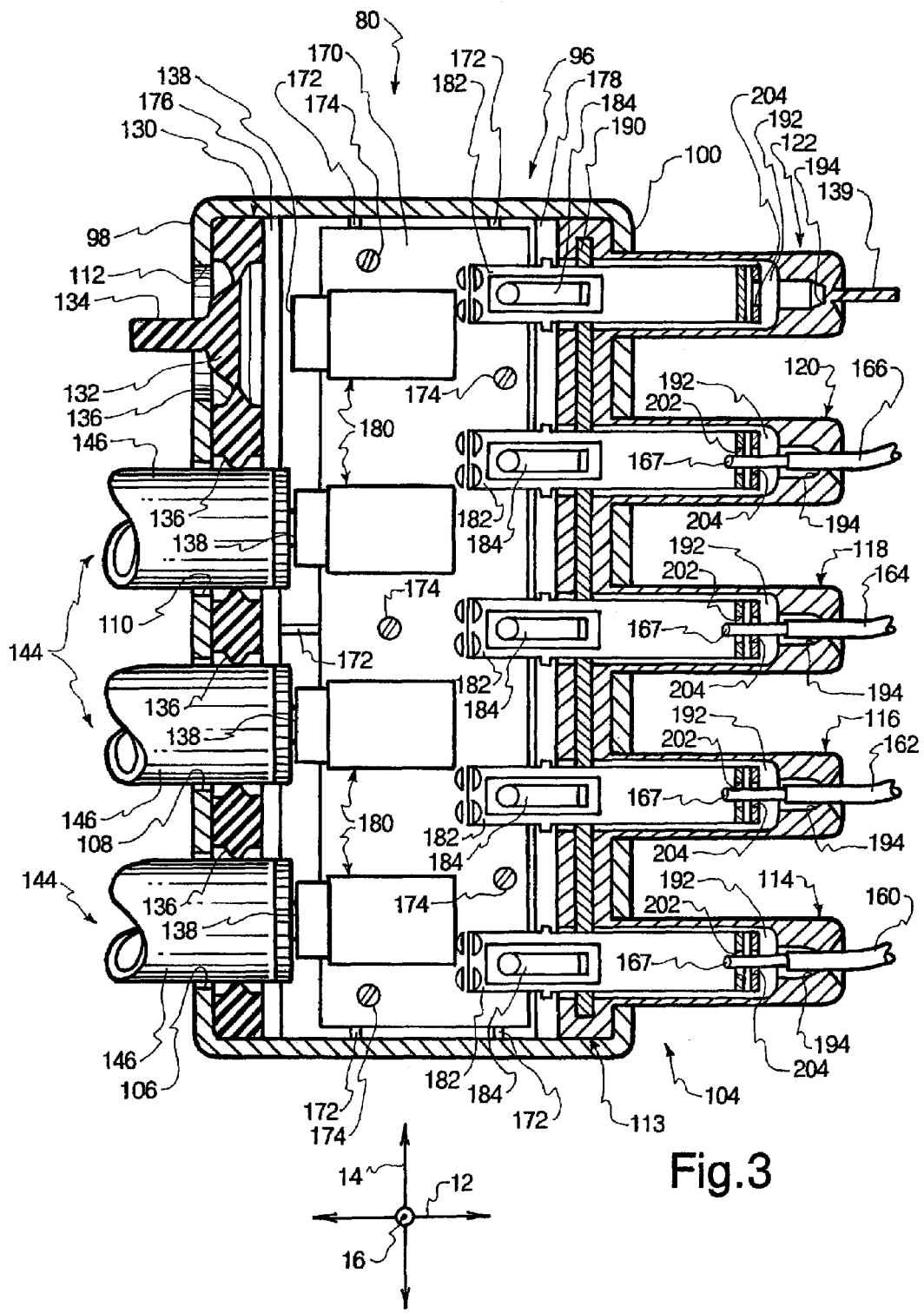
FIG. 3 is a top elevation, section view of the junction unit of the irrigation system of FIG. 1.

Referring to FIG. 3, a top elevation, section view of the junction unit 80 is depicted. As shown, a support board 170 is disposed within the housing 96. The support board 170 rests on a plurality of standoffs 172 integrally formed with the housing 96. Additionally, the support board 170 is attached to the housing 96 through the use of a plurality of fasteners, such as the screws 174 illustrated in FIG. 3. The support board 170 is disposed between a valve side support wall 176, which is proximate the valve side face 98, and a control side support wall, which is proximate the control side face 100.

A plurality of jack modules 180 are attached to the support board 170. The jack modules 180 provide the jacks 138 of the valve wire receptacles 102. Furthermore, lower contact arms 182 and upper contact arms 184 for each of the finger grips 114, 116, 118, 120, 122 are also attached to the support board 170, and may be attached to or abut the interior of the housing 96 as well.

As mentioned previously, the first, second, and third hot wires 162, 164, 166 are to be electrically coupled to the first, second, and third sets of valve wires 66, 68, 70, respectively. Thus, the contact arms 182, 184 of the first finger grip 116 are electrically coupled to the jack module 180 of the first valve wire receptacle 106. The contact arms 182, 184 of the second finger grip 118 are electrically coupled to the jack module 180 of the second valve wire receptacle 108. The contact arms 182, 184 of the third finger grip 120 are electrically coupled to the jack module 180 of the third valve wire receptacle 110.

The common wire 160 is to be electrically coupled to all of the valve wires 66, 68, 70. Hence, the contact arms 182, 184 of the common finger grip 114 are electrically coupled to the jack modules 180 of the first, second, and third valve wire receptacles 106, 108, 110.

Electrical connection between the contact arms 182, 184 and the jack modules 180 may generally be made through the use of a stamped, conductive set of current pathways (not shown), which may be attached to the support board 170 or supported by direct attachment with the housing 96. According to one alternative embodiment, the support board 170 may be a printed circuit board, with current pathways between the contact arms 182, 184 and the jack modules 180 formed through conventional layering and etching techniques.

The contact arms 182, 184 of the fourth finger grip 122 are electrically coupled to the jack module 180 of the fourth valve wire receptacle 112, even though the fourth finger grip 122 and the fourth valve wire receptacle 112 are not in use. Similarly, the contact arms 182, 184 of the common finger grip 114 are electrically coupled to the jack module 180 of the fourth valve wire receptacle 112. The junction unit 80 is thus capable of connecting up to four valves to the timer 90. The use of the blocking members 113, 130 with their associated frangible portions 132 and protrusions 134, 139, maintains the general watertightness of the junction unit 80, regardless of how many valves are actually coupled to the junction unit 80.

The blocking member 113 is generally captured between the control side face 100 and the control side support wall 178. Similarly, the blocking member 130 is generally captured between the valve side face 98 and the valve side support wall 176. The blocking member 130 may simply be sandwiched between the valve side face 98 and the valve side support wall 176. The blocking member 113 may be held in place through the use of a stiffening member 190 constructed of a comparatively stiff and nonconductive material such as plastic, silicon, mica, a wood laminate, or some combination thereof.

Each of the finger grips 114, 116, 118, 120, 122 has an interior cavity 192. In the case of the blocking member 113, each finger grip 114, 116, 118, 120, 122 has a frangible portion consisting of a protrusion 139. The protrusions 139 of the common, first, second, and third finger grips 114, 116, 118, 120 have all been removed to permit the insertion of the stripped portions 167 of the control unit wires 86. However, the protrusion 139 of the fourth finger grip 122 is still intact, as depicted.

The regions surrounding the protrusions 139 are thin, so that each protrusion 139 may be torn away to leave a circular lip 194. The circular lips 194 of the finger grips 114, 116, 118, 120, 122 are sized to press against the insulative coverings of the control unit wires 86 to provide a generally watertight seal.

According to one alternative embodiment (not shown), no protrusions 139 are used. Rather, each finger grip has a frangible portion that takes the form of a thin, generally circular portion. The thin, generally circular portion will keep water out when intact, and will rupture inward in response to pressure form a thin protrusion such as the stripped portion 167 of one of the control unit wires 86. A stripped portion 167 may simply be pressed into the thin, generally circular portion to induce breakage of the thin, generally circular portion. The thin, generally circular portion does not tear away, but remains attached to the finger grip to press against the wire, thereby aiding in providing a substantially watertight seal when the wire is present.

Returning to the junction unit 80 illustrated in FIG. 3, each of the lower contact arms 182 has a hole 202. Similarly, each of the upper contact arms 184 has a hole 204. Each of the finger grips 114, 116, 118, 120, 122 may be squeezed to bring a hole 202 into alignment with a hole 204 so that the stripped portion 167 of the corresponding control unit wire 86 can be inserted through the hole 202 and the hole 204. The finger grips 114, 116, 118, 120, 122 may then be released to permit the contact arms 182, 184 to relax, thereby grasping the stripped portion 167. The manner in which the finger grips 114, 116, 118, 120, 122 operate to retain the control unit wires 86 will be further shown and described in connection with FIG. 4.

Figure 4:
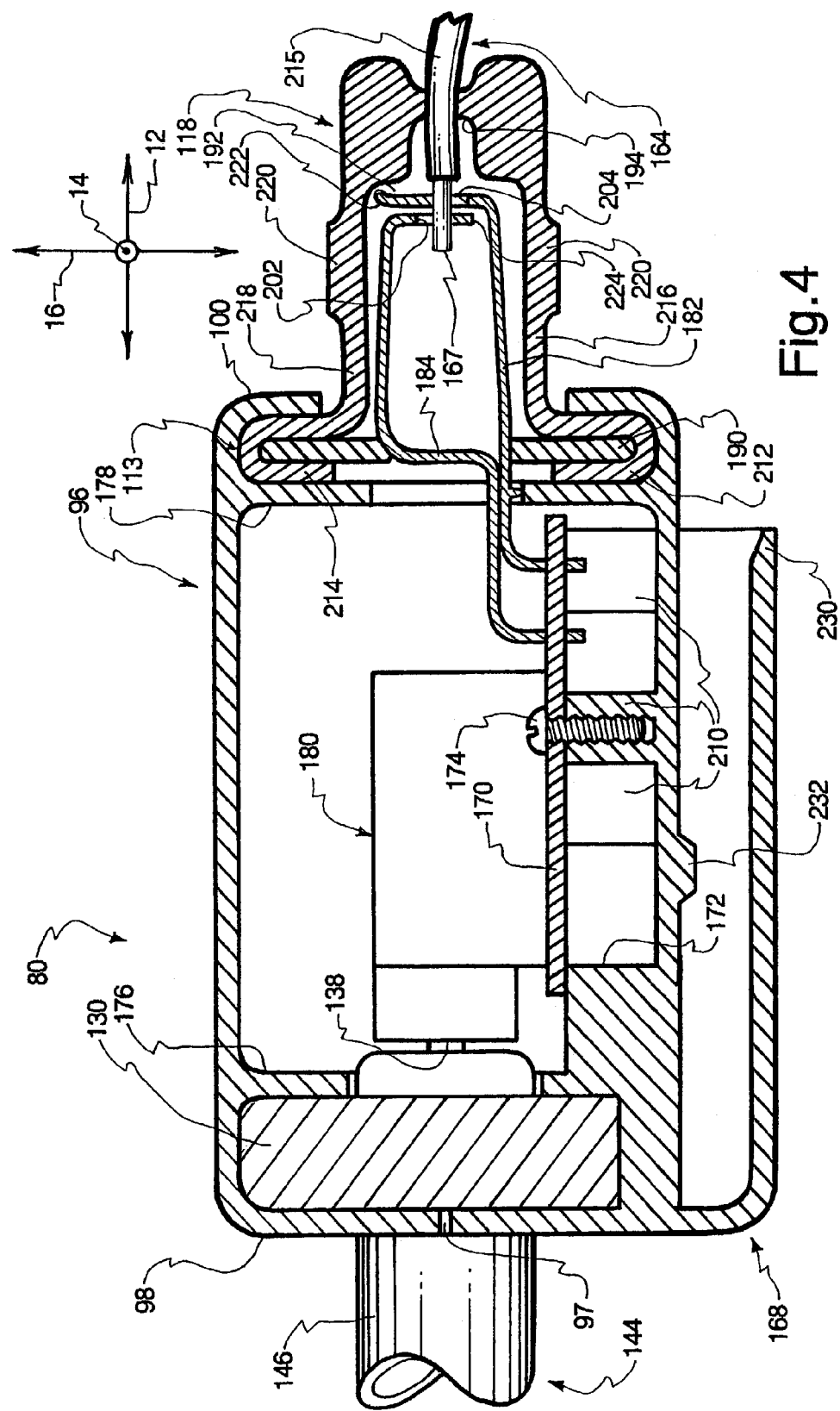
FIG. 4 is a side elevation, section view of the junction unit of the irrigation system of FIG. 1.

Referring to FIG. 4, a side elevation, section view of the junction unit 80 is depicted. The section is taken through the center of junction unit 80, and therefore passes through the second finger grip 118 and between the second and third valve wire receptacles 108, 110. As shown, the screws 174 are threadably engaged within a number of threaded receivers 210 that are integrally formed with the housing 96. The support board 170 may rest on the threaded receivers 210 in addition to the standoffs 172.

The blocking member 113 has a lower retention portion 212 and an upper retention portion 214 that cooperate to capture upper and lower edges of the stiffening member 190. The stiffening member 190 helps to ensure that the blocking member 113 remains captured between the control side face 100 and the control side support wall 178 and that the contact arms 182, 184 bend in the desired manner.

The junction unit 80 may be manufactured in a comparatively simple manner. According to one example, the two portions of the housing 96 are first formed through a method such as injection molding. The support board 170 is cut to size and the conductive set of current pathways is stamped into the desired shape and, if desired, attached to the support board. The jack modules 180 may be obtained from a suitable supplier and attached to the support board 170. The contact arms 182, 184 may also be stamped into the desired shape and attached to the support board.

The stiffening member 190 is inserted between the lower and upper retention portions 212, 214 of the blocking member 113. The stiffening member 190 and the blocking member 113 are then inserted over the contact arms 182, 184, such that the contact arms 182, 184 extend into the finger grips 114, 116, 118, 120, 122 of the blocking member 113.

The support board 170 with the attached jack modules 180, contact arms 182, 184, blocking member 113, and stiffening member 190, is then attached within the cavity of the lower portion of the housing 96, for example, using the screws 174. Simultaneously, the blocking member 113 is inserted into the space between the control side face 100 and the control side support wall 178 of the portion of the housing 96. If desired, some or all of the contact arms 182, 184 may be attached to the portion of the housing 96.

The blocking member 130 is also inserted into the space between the valve side face 98 and the valve side support wall 176. The frangible portions 132 of the blocking member 130 and the protrusions 139 of the blocking member 113 are intact. The two parts of the housing 96 may then be attached together through any of the previously mentioned methods.

The junction unit 80 is then ready to use. Those of skill in the art will recognize that the method described above may be varied in a wide variety of ways within the scope of the invention. The junction unit 80 may be easily used to connect the timer 90 to the valve assemblies 46, 48, 50. One connection method will be described as follows, with reference to the irrigation system 10.

The valve wires 66, 68, 70 may first be attached at their valve ends 140 to the actuators 62 of the corresponding valve assemblies 46, 48, 50. Alternatively, the actuators 62 may be manufactured with the valve wires 66, 68, 70 already attached. A control end (not visible in FIG. 4) of the control unit wires 86 is also attached to the control unit, e.g., the timer 90 in the embodiment of FIG. 1.

The junction ends 142 of the valve wires 66, 68, 70 are then coupled to the first, second, and third valve wire receptacles 106, 108, 110. This is accomplished by grasping the grips 146 and inserting the prongs 148 of the plugs 144 into the jacks 138. As mentioned previously, the circular lips 136 of the blocking member 130 press against the grips 146 to restrict moisture entry into the junction unit 80 through the valve wire receptacles 106, 108, 110. Junction ends 215 (shown in FIG. 4) of the control unit wires 86 are also inserted into the finger grips 114, 116, 118, 120, as will be further described below.

Each of the finger grips 114, 116, 118, 120, 122 has a lower wall 216 and an upper wall 218 that bound the associated interior cavity 192. Each of the walls 216, 218 has a plurality of ridges 220 configured to be compressed by the thumb and index finger of a user to bend the walls 216, 218 inward, thereby bending the contact arms 182, 184 inward. Each of the lower and upper contact arms 182, 184 has a transverse extension 222 or 224, respectively, that extends in the transverse direction 16. The holes 202, 204 of the lower and upper contact arms 182, 184 are disposed on the transverse extensions 222, 224. The transverse extensions 222, 224, and therefore the holes 202, 204, are thus oriented generally perpendicular to the control unit wires 86.

When the contact arms 182, 184 are undeflected, the holes 202, 204 are not aligned with each other. In response to pressure on the ridges 220 from a user, the contact arms 182, 184 deflect to bring the holes 202, 204 into alignment with each other. A control unit wire 86, for example, the second hot wire 164 shown in FIG. 4, may be inserted through the opening left by removal of the protrusion 139 from the second finger grip 118. The stripped portion 167 of the second hot wire 164 is inserted into the opening and through both of the holes 202, 204.

The second finger grip 118 is then released so that the contact arms 182, 184 withdraw toward their undeflected positions. The holes 202, 204 are drawn out of alignment so that the upper edge of the hole 202 of the lower contact arm 182 and the lower edge of the hole 204 of the upper contact arm effectively grip the stripped portion 167. The stripped portion 167 is sufficiently short that the insulative cover of the second hot wire 164 is gripped by the opening of the second finger grip 118 in watertight fashion.

This same procedure may also be used to couple the common wire 160, the first hot wire 162, and the third hot wire 166 to the common finger grip 114, the first finger grip 116, and the third finger grip 120, respectively, thereby completing attachment of the junction ends 215 of the control unit wires 86 to the junction unit 80. The first, second, and third hot wires 162, 164, 166 are then electrically coupled to the first, second, and third valve assemblies 46, 48, 50, respectively. Additionally, the common wire 160 is electrically coupled to all of the valve assemblies 46, 48, 50, as discussed previously.

The finger grips 114, 116, 118, 120, 122 represent only one of many possible configurations that provide easy wire retention. According to another example, a finger grip (not shown) may have only one arm that is designed to deflect to hold a stripped portion 167 of one of the control unit wires 86 against a stationary member. Such a finger grip may only require pressure from one side to permit insertion of the stripped portion 167. Releasing the side would then cause the finger grip to retain the stripped portion. Electricity then passes between the stripped portion 167 and the interior of the junction unit via the single arm.

According to another alternative embodiment, finger grips, either of the type depicted in the drawings, or of the type described in the immediately preceding paragraph, may be covered at least partially by a plastic covering. Such a plastic covering may be designed to protect the finger grips and/or facilitate squeezing the finger grips to permit insertion of the stripped portions 167. For example, such a plastic covering may have bendable flanges, each of which extends alongside one of the finger grips. Each flange may have a perpendicular fin that a user can press to bend the flange, thereby compressing the corresponding finger grip.

Returning to the junction unit 80 depicted in FIG. 4, the junction unit 80 may be easily and reliably anchored through the use of the socket 168, together with a corresponding anchoring mechanism designed to mate with the socket 168. As shown in FIG. 4, the socket 168 has a beveled lip 230 designed to facilitate entry of a flat member into the socket 168. The socket 168 also has a retention ridge 232 extending downward to help keep the anchoring mechanism in place, as will be described in connection with FIGS. 5 and 6.

Figure 5:
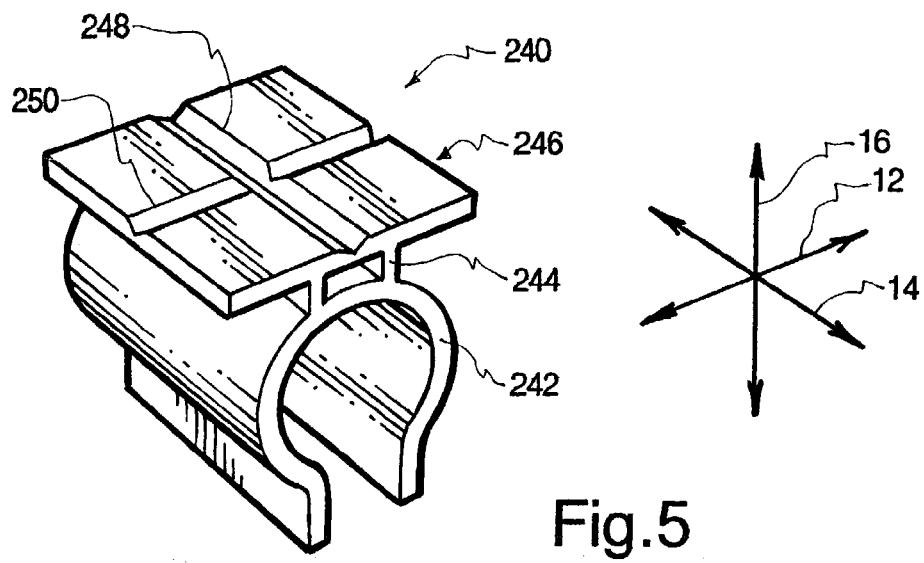
FIG. 5 is a perspective view of one embodiment of an anchoring mechanism suitable for the junction unit of the irrigation system of FIG. 1.

Referring to FIG. 5, a perspective view illustrates one embodiment of an anchoring mechanism according to the invention. In this application, an "anchoring mechanism" is any mechanism designed to attach one object to another. In FIG. 5, the anchoring mechanism is a pipe clip 240, which may be constructed of a lightweight, comparatively flexible material such as a plastic. Other materials such as metals may alternatively be used. The pipe clip 240 may be integrally formed.

The pipe clip 240 has a gripping portion 242, which is generally C-shaped and designed to deflect to snap into engagement with the manifold 72, one of the conduits 36, 38, 40, or the main line 24. Since the manifold 72, the conduits 36, 38, 40, and the main line 24 may include pipes of different sizes, the gripping portion 242 may be designed to grip pipes with a variety of sizes. According to one example, the gripping portion 242 may be designed to grip pipes with nominal diameters ranging from ¾ inches to one inch.

The pipe clip 240 also has a shank 244 that connects the gripping portion 242 with a platform 246. The platform 246 is designed to slide into engagement with the socket 168 of the junction unit 80. The platform 246 has a lateral channel 248 and a longitudinal channel 150, each of which is designed to receive the retention ridge 232 of the socket 168.

Thus, the platform 246 may be inserted into the socket 168 with the gripping portion 242 in either of two distinct, orthogonal orientations with respect to the junction unit 80. In either orientation, the retention ridge 232 will snap into engagement with one of the channels 248, 250 when the platform 246 has been fully inserted into the socket 168 to retain the pipe clip 240. The platform 246 may be inserted into the socket 168 before or after engagement of the gripping portion 242 with the manifold 72, one of the conduits 36, 38, 40, or the main line 24. The junction unit 80 may alternatively be attached to the ground within or near the manifold box 82 through the use of a different anchoring mechanism, as will be described in connection with FIG. 6.

If desired, a differently configured gripping portion (not shown) may be used to provide enhanced adaptability for different pipe sizes. For example, such a gripping portion may be elongated somewhat in the transverse direction 16. The gripping portion may have straight, transversely extending sections adjacent to the shank 244, which terminate in curved portions arced in a manner similar to that of the gripping portion 242 of FIG. 5. Such elongated gripping arms provide a wider spread without unduly stressing the material where the gripping portion joins with the shank 244.

Figure 6:
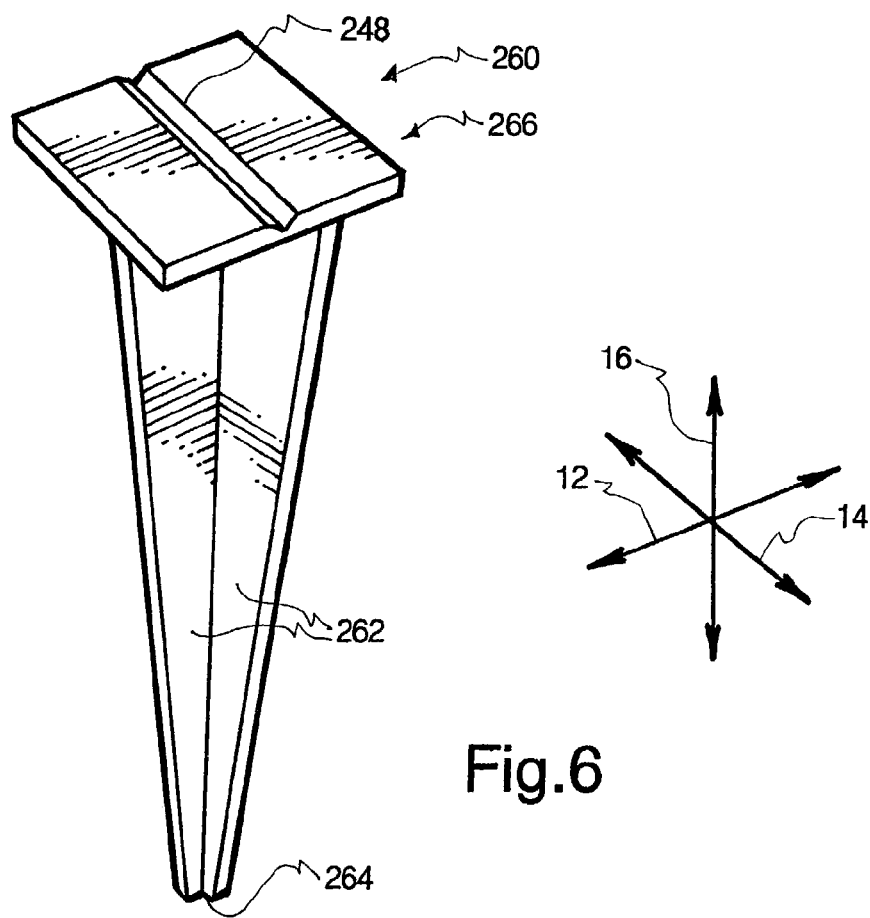
FIG. 6 is a perspective view of another embodiment of an anchoring mechanism suitable for the junction unit of the irrigation system of FIG. 1.

Referring to FIG. 6, a perspective view illustrates another embodiment of an anchoring mechanism according to the invention, in the form of a stake 260. The stake 260 has a number of tapered flanges 262 that converge to provide a generally X-shaped cross section. The tapered flanges 262 terminate in a narrow portion 264 designed to be driven into the ground.

The stake 260 also has a platform 266 somewhat similar to the platform 246 of the pipe clip 240. However, since the tapered flanges 262 form a radially symmetrical shape, there is no need to provide multiple possible orientations for the platform 266 with respect to the socket 168. Thus, the platform 266 has only a lateral channel 248 like that of the platform 246 of the pipe clip 240.

The platform 266 of the stake 260 is inserted into the socket 168 of the junction unit 80 in the same manner as the platform 246 of the pipe clip 240. When the platform 266 has been fully inserted into the socket 168, the retention ridge 232 of the socket 168 slides into engagement with the lateral channel 248 to keep the stake 260 properly positioned with respect to the junction unit 80. The stake 260 may be driven into the ground before or after attachment to the socket 168.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An irrigation system configured to irrigate an area, the irrigation system comprising:
   a plurality of water distribution units, each of which distributes water over at least a portion of the area;
   a plurality of conduits for conveying water to the water distribution units;
   a plurality of valves, each of which has an open configuration permitting water flow into least one of the conduits and a closed configuration substantially blocking water flow into at least one of the conduits;
   a control unit transmitting valve activation signals to electrically trigger movement of the valves between the open and closed configurations;
   a common wire to be coupled to the control unit;
   a plurality of valve wires to be coupled to the valves; and
   a junction unit to electrically couple the common wire to the plurality of valve wires independent of any direct physical contact between the common wire and the plurality of valve wires, wherein the junction unit comprises a control unit wire receptacle for receiving a junction end of the common wire, a plurality of valve wire receptacles for receiving junction ends of the valve wires, and a blocking member positioned to restrict moisture entry into the junction unit, the blocking member having a frangible portion configured to be ruptured to permit wire insertion into one of the receptacles.

2. The irrigation system of claim 1, wherein the valve wire receptacles and the control unit wire receptacle maintain substantially watertight seals around the valve wires and the common wire, respectively, to restrict moisture contact with conductors of the valve wires and the common wire.

3. The irrigation system of claim 1, wherein the junction unit comprises a plurality of control unit wire receptacles configured to receive the junction end of the common wire and a junction end of at least one hot wire configured to be coupled to the control unit.

4. The irrigation system of claim 1, wherein each of the valve wires comprises a plug disposed at the junction end, wherein each of the valve wire receptacles comprises a jack configured to receive and retain at least a portion of one of the plugs.

5. The irrigation system of claim 1, wherein the control unit wire receptacle is actuated by a user to receive the junction end of the common wire and to retain the junction end in response to cessation of user actuation.

6. The irrigation system of claim 1, further comprising an anchoring mechanism configured to anchor the junction unit proximate the valves.

7. A valving system for controlling flows of irrigation water, the valving system comprising:
   a plurality of valves, each of which has an open configuration permitting water flow to at least one water distribution unit and a closed configuration substantially blocking water flow to the water distribution unit;
   a control unit configured to transmit valve activation signals to electrically trigger movement of the valves between the open and closed configurations;
   a plurality of control unit wires configured to be coupled to the control unit to receive the valve activation signals;
   a plurality of valve wires configured to be coupled to the valves to convey the valve activation signals to the valves, wherein each of the valve wires comprises a plug disposed at the junction end; and
   a junction unit configured to electrically couple the plurality of control unit wires to the plurality of valve wires to convey the valve activation signals from the control unit wires to the valve wires, wherein the junction unit comprises a plurality of control unit wire receptacles for receiving junction ends of the control unit wires and a plurality of valve wire receptacles for receiving junction ends of the valve wires, wherein each of the valve wire receptacles comprises a jack configured to receive and retain at least a portion of one of the plugs.

8. The valving system of claim 7, wherein the valve wire receptacles and the control unit wire receptacles are configured to maintain substantially watertight seals around the valve wires and the control unit wires, respectively, to restrict moisture contact with conductors of the valve wires and the control unit wires.

9. The valving system of claim 8, wherein the junction unit further comprises a blocking member positioned to restrict moisture entry into the junction unit, the blocking member having a frangible portion configured to be ruptured to permit wire insertion into one of the receptacles.

10. The valving system of claim 7, wherein the control unit wires comprise a common wire and a plurality of hot wires, wherein the junction unit is further configured to electrically couple each of the hot wires to one of the valve wire receptacles, and to electrically couple the common wire to all of the valve wire receptacles.

11. The valving system of claim 7, wherein each of the control unit wire receptacles is configured to be actuated by a user to receive the junction end of one of the control unit wires and to retain the junction end in response to cessation of user actuation.

12. The valving system of claim 7, further comprising an anchoring mechanism configured to anchor the junction unit proximate the valves.

13. A junction unit for a valving system for controlling flows of irrigation water, the junction unit comprising:
   a control unit wire receptacle to retain a junction end of a common wire in watertight fashion; and
   a valve wire receptacle to retain a junction end of a valve wire in watertight fashion, wherein the valve wire comprises a plug disposed at the junction end and the valve wire receptacle comprises a jack for receiving and retaining at least a portion of the plug;
   wherein the control unit wire receptacle is in electrical communication with the valve wire receptacle to permit the conveyance of a valve activation signal from the common wire to the valve wire.

14. The junction unit of claim 13, further comprising a blocking member positioned to restrict moisture entry into the junction unit, the blocking member having a frangible portion to be ruptured to permit wire insertion into one of the receptacles.

15. The junction unit of claim 13, further comprising a plurality of additional control unit wire receptacles, each of which for retaining a hot wire, the junction unit further comprising at least one additional valve wire receptacle, wherein the junction unit electrically couples each of the hot wires to one of the valve wire receptacles, and electrically couples the common wire to all of the valve wire receptacles.

16. The junction unit of claim 13, wherein the control unit wire receptacle is actuated by a user to receive the junction end of the control unit wire and to retain the junction end in response to cessation of user actuation.

17. A water resistant junction unit comprising:
   a receptacle having an occupied configuration in which the receptacle retains a junction end of a wire and an unoccupied configuration in which the receptacle is vacant; and
   a blocking member having a frangible portion configured to restrict moisture entry into the receptacle in the vacant configuration, wherein the frangible portion may be ruptured to permit insertion of the junction end into the receptacle.

18. The water resistant junction unit of claim 17, wherein the blocking member is configured such that rupturing the frangible portion leaves an opening in the blocking member sized to permit insertion of the junction end through the opening and to grip the junction end to restrict moisture entry into the receptacle through the opening when the junction end is disposed in the receptacle.

19. The water resistant junction unit of claim 17, wherein the frangible portion comprises a protrusion for gripping with fingers of a user and pulled to tear away the frangible portion.

20. The water resistant junction unit of claim 17, wherein the wire comprises a plug disposed at the junction end and the receptacle comprises a jack for receiving and retaining the plug.

21. The water resistant junction unit of claim 17, wherein the receptacle is actuated by a user to receive the junction end and to retain the junction end in response to cessation of user actuation.

22. A water resistant junction unit comprising:
   a receptacle for receiving a junction end of a wire and retaining the junction end; and
   a blocking member constructed of a resilient material, the blocking member having an opening sized to permit insertion of the junction end through the opening and to grip the junction end to restrict moisture entry into the receptacle through the opening when the junction end is disposed in the receptacle.

23. The water resistant junction unit of claim 22, wherein the opening is formed by rupturing a frangible portion of the blocking member, wherein, prior to rupturing, the frangible portion is configured to restrict moisture entry into the receptacle.

24. The water resistant junction unit of claim 22, wherein the junction end comprises an insulative sheath surrounding a conductor, wherein upon insertion of the junction end into the receptacle, the blocking member grips the insulative sheath to restrict moisture contact with the conductor.

25. The water resistant junction unit of claim 22, wherein the wire comprises a plug disposed at the junction end and the receptacle comprises a jack for receiving and retaining the plug, wherein the plug comprises an insulative housing and a prong, wherein upon insertion of the junction end into the receptacle, the blocking member grips the insulative housing to restrict moisture contact with the prong.

26. The water resistant junction unit of claim 22, wherein the receptacle is actuated by a user to receive the junction end and to retain the junction end in response to cessation of user actuation.

27. A method for assembling a valving system for controlling irrigation water flow to at least one water distribution unit, the valving system having a control unit transmitting a valve activation signal to electrically trigger movement of the valve between open and closed configurations, a control unit wire to be coupled to the control unit to receive the valve activation signal, a valve wire to be coupled to the valve to convey the valve activation signal to the valve, and a junction unit having a valve wire receptacle and a control unit wire receptacle, the method comprising:
   inserting a junction end of the valve wire into the valve wire receptacle, wherein the valve wire comprises a plug disposed at the junction end and the receptacle comprises a jack for receiving and retaining the at least a portion of the plug, wherein inserting the junction end of the valve wire into the valve wire receptacle comprises inserting at least a portion of the plug into the jack; and
   inserting a junction end the control unit wire into the control unit wire receptacle to electrically couple the control unit wire to the valve wire to convey the valve activation signal from the control unit wires to the valve wires.

28. The method of claim 27, further comprising:
   electrically coupling a valve end of the valve wire to the valve; and
   electrically coupling a control end of the control unit wire to the control unit.

29. The method of claim 28, wherein the junction unit comprises a blocking member to restrict moisture entry into the valve wire receptacle, the blocking member having a frangible portion, the method further comprising rupturing the frangible portion to form an opening in the blocking member, wherein the opening is sized to permit insertion of at least a portion of the plug through the opening and to grip the plug to restrict moisture entry into the receptacle.

30. The method of claim 27, wherein inserting the junction end of the control unit wire into the control unit wire receptacle comprises:
   actuating the control unit wire receptacle;
   inserting the junction end of the control unit wire into the control unit wire receptacle; and releasing the control unit wire receptacle to induce the control unit wire receptacle to retain the junction end.

31. The method of claim 30, wherein the junction unit comprises a blocking member to restrict moisture entry into the control unit wire receptacle, the blocking member having a frangible portion, the method further comprising rupturing the frangible portion to form an opening in the blocking member, wherein the opening is sized to permit insertion of at least a portion of the junction end of the control unit wire through the opening and to grip the junction end to restrict moisture entry into the receptacle.

32. The method of claim 27, wherein the junction unit further comprises at least one additional valve wire receptacle and at least two additional control unit wire receptacles, the valving system comprising at least one additional valve, at least one additional valve wire, and at least two additional control unit wires, the control unit wires comprising a common wire and at least two hot wires, the method further comprising coupling the additional control wires and the additional valve wire to the junction unit such that each hot wire is in electrical communication with one of the valves and the common wire is in electrical communication with all of the valves.

* * * * *